(12) United States Patent
Lee (10) Patent No.: US 9,426,359 B2
(45) Date of Patent: Aug. 23, 2016

(54) DIGITAL IMAGE SIGNAL PROCESSING METHOD, MEDIUM FOR RECORDING THE METHOD, AND DIGITAL IMAGE SIGNAL PROCESSING APPARATUS

(71) Applicant: SAMSUNG ELECTRONICS CO., LTD., Suwon-si, Gyeonggi-do (KR)

(72) Inventor: Jang-won Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/210,982

(22) Filed: Mar. 14, 2014

(65) Prior Publication Data

US 2014/0192228 A1 Jul. 10, 2014

Related U.S. Application Data

(62) Division of application No. 12/721,711, filed on Mar. 11, 2010, now Pat. No. 8,687,126.

(30) Foreign Application Priority Data

Aug. 5, 2009 (KR) .................. 10-2009-0072121

(51) Int. Cl.
| | | |
|---|---|---|
| *H04N 5/232* | (2006.01) | |
| *G06K 9/62* | (2006.01) | |
| *H04N 1/21* | (2006.01) | |

(Continued)

(52) U.S. Cl.
CPC ............. *H04N 5/23229* (2013.01); *G06K 9/62* (2013.01); *H04N 1/00336* (2013.01); *H04N 1/00923* (2013.01); *H04N 1/2112* (2013.01); *H04N 1/00326* (2013.01); *H04N 2101/00* (2013.01); *H04N 2201/212* (2013.01); *H04N 2201/214* (2013.01)

(58) Field of Classification Search
CPC ... H04N 5/147; H04N 5/144; H04N 7/26898; H04N 7/26143; G11B 27/28
See application file for complete search history.

(56) References Cited

U.S. PATENT DOCUMENTS

| | | | |
|---|---|---|---|
| 7,362,360 | B2 | 4/2008 | Kim et al. |
| 2004/0174434 | A1 | 9/2004 | Walker et al. |

(Continued)

FOREIGN PATENT DOCUMENTS

| | | |
|---|---|---|
| CN | 101076075 A | 11/2007 |
| CN | 101420612 A | 4/2009 |

(Continued)

OTHER PUBLICATIONS

Office Action issued for CN 201010216938.9 (Sep. 22, 2014).

(Continued)

*Primary Examiner* — Allen Parker
*Assistant Examiner* — Long Le
(74) *Attorney, Agent, or Firm* — Drinker Biddle & Reath LLP (57) ABSTRACT

Provided is a digital image signal processing method, a recording medium for recording the method, and a digital image signal processing apparatus, in which a storage area of a memory may be efficiently used and an image desired by a user can be stored even when the storage area of the memory is insufficient. According to the present invention, a scene of an image may be recognized and a resolution and an image quality may be modified according to the recognized scene, thereby efficiently using the storage area of the memory.

19 Claims, 9 Drawing Sheets

(51) Int. Cl.
*H04N 1/00* (2006.01)
*H04N 101/00* (2006.01)

(56) References Cited

U.S. PATENT DOCUMENTS

| | | | |
|---|---|---|---|
| 2005/0259158 A1* | 11/2005 | Jacob | H04N 3/1562 348/218.1 |
| 2006/0012616 A1* | 1/2006 | Paek | G09G 3/20 345/698 |
| 2006/0193524 A1* | 8/2006 | Tarumoto | H04N 7/17318 382/232 |
| 2007/0171983 A1* | 7/2007 | Akiyoshi et al. | 375/240.25 |
| 2008/0192129 A1 | 8/2008 | Walker et al. | |
| 2008/0211927 A1* | 9/2008 | Nozaki | H04N 1/2112 348/231.7 |
| 2009/0103817 A1 | 4/2009 | Jang | |
| 2009/0231441 A1 | 9/2009 | Walker et al. | |
| 2010/0020191 A1* | 1/2010 | Sugimoto | H04N 5/14 348/222.1 |
| 2010/0027961 A1* | 2/2010 | Gentile | G06T 5/50 386/278 |
| 2010/0134688 A1 | 6/2010 | Moriwake | |

FOREIGN PATENT DOCUMENTS

| | | |
|---|---|---|
| CN | 101453642 A | 6/2009 |
| CN | 101751672 A | 6/2010 |
| JP | 2003-344891 A | 12/2003 |
| JP | 2006-191477 | 7/2006 |
| KR | 10-2004-0039103 A | 5/2004 |
| KR | 10-2009-0032292 A | 4/2009 |

OTHER PUBLICATIONS

Office Action issued for CN 201010216938.9 (Jan. 6, 2014).
Office Action issued for CN 201010216938.9 (Apr. 13, 2015).
Office Action issued for related application KR 10-2009-0072121, Aug. 4, 2015, 11 pages.
Office Action issued for related application CN 201010216938.9, Nov. 2, 2015, 14 pages.
Office Action issued for related application KR 10-2009-0072121, Jan. 8, 2016, 8 pages.
Notice of Allowance issued for related application KR 10-2009-0072121, with English language translation, Feb. 23, 2016, 4 pages.

* cited by examiner

| SCENE | RESOLUTION | IMAGE QUALITY |
|---|---|---|
| NIGHT VIEW SCENE | 3648 x 2736 | Super fine |
| PORTRAIT SCENE | 2048 x 1536 | Fine |
| FRAME GUIDE SCENE | 1024 x 768 | Super fine |
| ⋮ | ⋮ | ⋮ |

| SCENE | RESOLUTION PRIORITY | IMAGE QUALITY PRIORITY |
|---|---|---|
| NIGHT VIEW SCENE | 1 | 1 |
| PORTRAIT SCENE | 4 | 2 |
| FRAME GUIDE SCENE | 5 | 1 |
| ⋮ | ⋮ | ⋮ |

| PRIORITY | RESOLUTION PRIORITY | PRIORITY | IMAGE QUALITY |
|---|---|---|---|
| 1 | 3648 x 2736 | 1 | Super fine |
| 2 | 3072 x 2304 | 2 | Fine |
| 3 | 2592 x 1944 | 3 | Super fine |
| 4 | 2048 x 1536 | | |
| 5 | 1024 x 768 | | |

DIGITAL IMAGE SIGNAL PROCESSING METHOD, MEDIUM FOR RECORDING THE METHOD, AND DIGITAL IMAGE SIGNAL PROCESSING APPARATUS

CROSS-REFERENCE TO RELATED PATENT APPLICATIONS

This application is a divisional of U.S. patent application Ser. No. 12/721,711, filed Mar. 11, 2010, which claims the benefit of Korean Patent Application No. 10-2009-0072121, filed on Aug. 5, 2009, in the Korean Intellectual Property Office, the disclosures of which are incorporated herein in their entirety by reference.

BACKGROUND

The present invention relates to a digital image signal processing method for compressing an image and storing the same in a memory, a recording medium for recording the method, and a digital image signal processing apparatus.

A digital image processing apparatus, such as a digital camera, includes a memory in which an image can be compressed and stored. The memory has a limited capacity and thus cannot limitlessly store images. Accordingly, the user needs to check the capacity of the memory frequently to selectively delete images or move the images to another digital image processing apparatus.

However, when the user cannot check the capacity of the memory and cannot delete the previously stored images, or if a size of an image to be photographed and stored is more than the capacity of the memory, problems occur in storing an additionally photographed image due to the limited capacity of the memory.

SUMMARY

The present invention provides a digital image signal processing method in which a storage space of a memory can be efficiently used, a recording medium for recording the method, and a digital image signal processing apparatus.

According to an aspect of the present invention, there is provided a digital image signal processing method comprising: recognizing, with a processor, a scene of an image; determining, with the processor, a resolution and an image quality corresponding to the recognized scene; and compressing the image with the determined resolution and the determined image quality.

The method may further comprise: measuring a storage area of a memory; and comparing the storage area of the memory with a reference, wherein if the storage area of the memory is smaller than the reference, a resolution and an image quality corresponding to the recognized scene are determined.

The image may be obtained by restoring an image file stored in the memory.

The image may be an image input to an imaging device according to a photographing signal.

The method may further comprise generating a database including resolutions and image qualities according to scenes.

The database may be generated according to an input of a user.

The determining of a resolution and an image quality corresponding to the recognized scene may comprise: deducing a priority of the resolution and a priority of the image quality corresponding to the recognized scene; and determining a resolution and an image quality corresponding to the deduced priority of the resolution and the deduced priority of the image quality.

The method may further comprise, if compressing the image with the determined resolution and the determined image quality: calculating an available number of images that can be stored in the storage area of the memory; and displaying the available number of images.

The method may further comprise, if compressing the image with the determined resolution and the determined image quality: calculating an available number of images that can be stored in the storage area of the memory in which the images can be stored; displaying the available number of images; determining whether to compress the image; if the image is not to be compressed, adjusting at least one of the group consisting of the priority of the resolution and the priority of the image quality to a next priority; and deducing a resolution and an image quality corresponding to the adjusted priority of the resolution or the image quality.

The scene may be one selected from the group consisting of a frame guide scene, a night view scene, a portrait scene, a landscape scene, a macro scene, and a white scene.

A resolution of the landscape scene may be greater than a resolution of the portrait scene.

According to another aspect of the present invention, there is provided a computer readable recording medium having embodied thereon a program for executing the above-described method.

According to another aspect of the present invention, there is provided a digital image signal processing apparatus comprising: a scene recognition unit for recognizing a scene of an image; a database including resolutions and image qualities according to scenes; a resolution and image quality determining unit for determining a resolution and an image quality corresponding to the recognized scene by deducing from the database; a scaler for resizing the image to have the determined resolution; and a compression unit for compressing the image to have the determined image quality.

The scaler may comprise a plurality of scalers for resizing the image with different sizes, and the compressing unit may comprise a plurality of compression units that apply different compression rates to the image so as to have different image qualities.

The digital image signal processing apparatus may further comprise: a memory for storing an image file including the image; a measuring unit for measuring a storage area of the memory; a comparing unit for comparing the storage area of the memory with a reference; and a control unit for controlling such that if the storage area of the memory is smaller than the reference, the resolution and image quality determining unit determines a resolution and an image quality of the image.

The digital image signal processing apparatus may further comprise: a memory for storing an image file including the image; and a restoring unit for restoring the image file to deduce the image.

The digital image signal processing apparatus may further comprise an imaging device for inputting the image.

The database may comprise a first database including priorities of resolutions and image qualities according to scenes and a second database including resolutions corresponding to the priorities of the resolutions and image qualities corresponding to priorities of the image qualities, and the resolution and image quality determining unit may deduce from the first database the priorities of the resolutions and the priorities of the image qualities according to scenes, and from the second database the resolutions according to the priorities of the resolutions and the image qualities according to the priorities of the image qualities.

The digital image signal processing apparatus may further comprise, when compressing the image with the determined resolution and the determined image quality: a calculation unit that calculates an available number of images that can be stored in a remaining storage area of a memory; a display unit that displays the available number of images; a determining unit that determines whether to compress the image; and an adjusting unit that adjusts at least one of the group consisting of the priority of the resolution and the priority of the image quality to a next background priority, if the image is not to be compressed, wherein the resolution and image quality determining unit deduces a resolution and an image quality corresponding to the adjusted priority of the resolution or the image quality.

The database may comprise a resolution of a landscape scene that is greater than a resolution of a portrait scene.

Accordingly, by adjusting a resolution or an image quality according to a recognized scene of an image, desired images may be stored and the limited storage space of a memory can be efficiently used while storing a desired image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

A digital image signal processing apparatus according to an embodiment of the present invention is described in detail with reference to the attached drawings. A digital camera is described as an example of the digital image signal processing apparatus. However, the digital image signal processing apparatus is not limited to the digital camera, and the digital image signal apparatus may also be a mobile phone having the functions of the digital camera, a personal digital assistant (PDA), a portable multimedia player (PMP), TV, a digital frame, etc.

Figure 1:
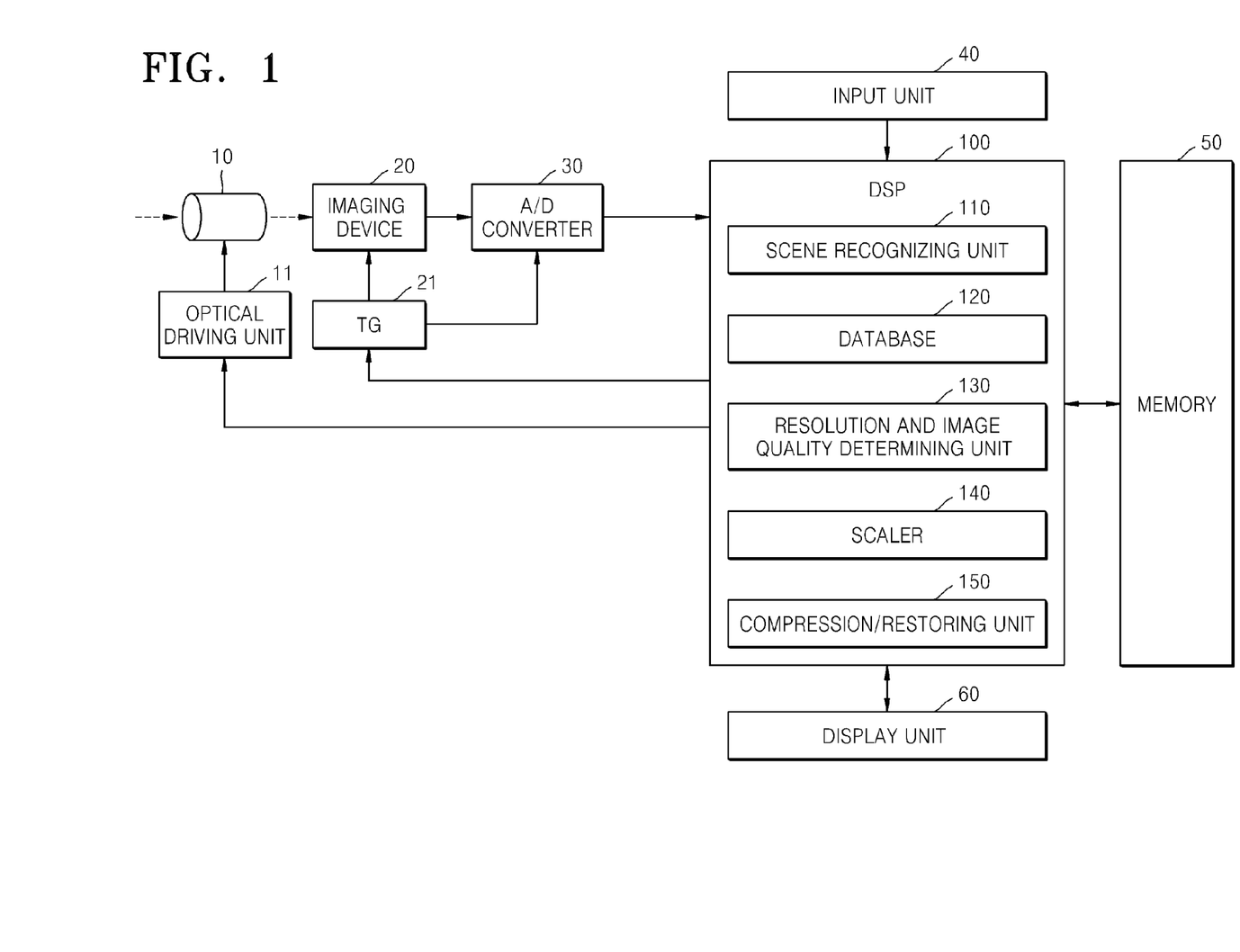
FIG. 1 is a block diagram illustrating a digital image signal processing apparatus according to an embodiment of the present invention.

FIG. 1 is a block diagram illustrating a digital image signal processing apparatus, here a digital camera, according to an embodiment of the present invention.

Referring to FIG. 1, the digital camera includes an optical unit 10 through which an optical signal is transmitted from a subject, an optical driving unit 11 for driving the optical unit 10, an imaging device 20 for converting the optical signal input through the optical unit 10 into an electrical signal, and an analog/digital (AD) converter 30 for converting the electrical signal with respect to one frame image transmitted from the imaging device 20 into a digital signal. Also, the digital camera includes a timing generator (TG) 21 for supplying a timing signal to the imaging device 20 and the A/D converter 30, an input unit 40 for inputting a manipulation signal of a user, a memory 50 for storing a program related to the operation of the digital camera, data required in executing the program, an image file, etc. and a display unit 60 for displaying an input image or an icon. Also, the digital camera includes a digital signal processor (DSP) 100 for controlling each of the above elements of the digital camera according to image signal processing or the program.

Each of the elements according to the current embodiment of the present invention may be formed of a chip, or at least two of the elements may be formed as a single chip.

Hereinafter, each of the elements of the digital camera will be described in detail.

The optical unit 10 may include a lens for focusing an optical signal, an aperture for adjusting an amount of the optical signal (light amount), a shutter for controlling an input of the optical signal, etc. The lens may include a zoom lens for adjusting a view of angle to be narrowed or widened or a focus lens for adjusting a focal point of a subject. Each of the lenses may comprise one sheet of lens or comprise a group of lenses. The optical unit 10 may comprise a shutter. A mechanic shutter having a cover that moves upward or downward may be used as the shutter. Alternatively, the function of the shutter may be performed by controlling a supply of an electrical signal to the imaging device 20, instead of using a separate shutter device.

The optical driving unit 11 for driving the optical unit 10 may move the position of the lens, open or close the aperture, or drive the shutter in order to perform auto-focusing, automatic exposure adjustment, zooming, focus changing, etc.

The imaging device 20 receives an optical signal transmitted through the optical unit 10 to form an image of a subject. Examples of the imaging device 20 include a complementary metal-oxide semiconductor (CMOS) sensor array, a charge-coupled device (CCD) sensor array, etc. The imaging device 20 may provide image data corresponding to an image of one frame according to a timing signal supplied from the TG 21.

The A/D converter 30 may generate image data of an image of one frame by converting an analog signal transmitted from the imaging device 20 into a digital signal. Alternatively, a circuit for performing adjustment of a gain or typifying a waveform may be included in the digital camera.

The input unit 40 may include components for manipulating the digital camera or conducting various settings during a photographing operation. For example, the input unit 40 may include buttons, keys, a touch panel, a touch screen, a dial, etc., and user manipulation signals such as a power on/off, a photographing start/stop, a replay start/stop/search, an operation of an optical system, mode conversion, menu manipulation, selection manipulation, etc., may be input through the input unit 40.

The memory 50 temporarily stores the image data or data required for calculation. Examples of the memory 50 are a synchronous dynamic random access memory (SDRAM), multi-chip package (MCP), or a dynamic random access memory (DRAM). Also, the memory 50 may store an operating system (OS), an application program, etc., which are needed to operate the digital camera. To store the OS or the application program, an electrically erasable programmable read only memory (E2PROM), a flash memory, a read only memory (ROM), etc., may be included. Also, the memory 50 stores an image file including an image that is input to the digital camera. To this end, a memory that is detachable from the digital camera may be included in the digital camera. Examples of the detachable memory include a secure digital card/multimedia (SDcard/MM), a hard disk drive (HDD), an optical disk, an optical magnetic disk, a hologram memory, etc.

The display unit 60 displays an image or an icon. For example, the display unit 60 may be a liquid crystal display (LCD), an organic light emitting display (OLED), a plasma display panel (PDP), or an electrophorestic display (EDD).

The DSP 100 performs image signal processing on the image data, and controls each element according to image signal processing or according to a user's manipulation signal input through the input unit 40. Also, the DSP 100 may reduce noise with respect to input image data, and may perform image signal processing for improving image quality, such as gamma correction, color filter array interpolation, color matrix, color correction, color enhancement, etc. Also, the DSP 100 may compress the image data generated by performing image signal processing thereon so as to improve the image quality thereof, thereby generating an image file, or may restore image data from the image file. The compression format of the image data may be a reversible format or an irreversible format. Examples of the appropriate format are a joint photographic experts group (JPEG) format and a JPEG 2000 format. Also, the DSP 100 may functionally perform obscuring, coloring, blurring, edge emphasis, image interpretation, image recognition, image effects, etc. In image recognition, face recognition may be performed. In addition, display image signal processing for displaying an image on the display unit 60 may be performed. The DSP 100 may perform predetermined image signal processing so as to display image data regarding an external monitor, and transmit the image data processed in this manner so as to be displayed on the external monitor.

The DSP 100 includes a scene recognition unit 110 for recognizing a scene from an input image, a database 120 in which resolutions and image qualities according to scenes are stored, a resolution and image quality determining unit 130 for determining a resolution and an image quality corresponding to the recognized scene, based on the database 120, a scaler 140 for resizing the image according to a determined resolution, and a compression/restoring unit 150 for compressing or restoring the image with a determined image quality. The scene recognition unit 110 may recognize a scene of an input image by comparing color components, luminance, or the like, of the image data with information of previously stored scenes. An image analyzed by the scene recognition unit 110 may be an image of one frame input through the imaging device 20 and the A/D converter 30, or an image that is deduced by restoring an image file stored in the memory 50 through the compression/restoring unit 150.

Figure 2:
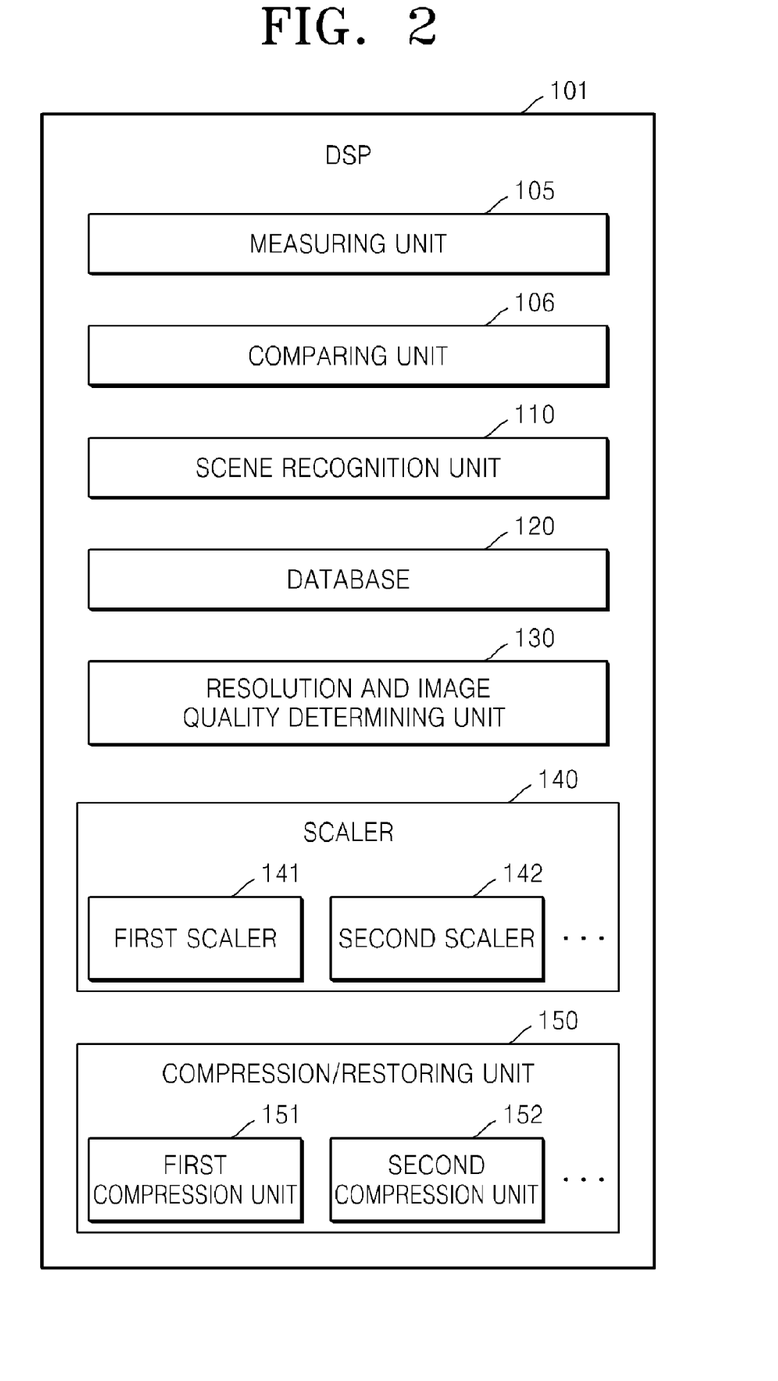
FIG. 2 is a block diagram illustrating another example of a digital signal processor (DSP) of the digital image signal processing apparatus illustrated in FIG. 1.

FIG. 2 is a block diagram illustrating a DSP 101 of the digital image signal processing apparatus of FIG. 1, according to another embodiment of the present invention. According to the current embodiment, a storage area of the memory 50 is automatically sensed, and if the remaining storage area is small, a resolution and an image quality of an image are adjusted according to a recognized scene of an image.

Referring to FIG. 2, the DSP 101 includes a measuring unit 105 for measuring a storage area of the memory 50, a comparing unit 106 for comparing the storage area of the memory 50 with predetermined references that are designated previously, the resolution and image quality determining unit 130 for determining a resolution and an image quality of an image corresponding to the recognized scene if the storage area of the memory 50 is smaller than the references, a scene recognition unit 110 for recognizing a scene with respect to an input image, and a database 120 for containing resolutions and image qualities according to scenes. Also, the DSP 101 includes a scaler 140 for resizing the image data with a resolution determined by the resolution and image quality determining unit 130, and a compression/restoring unit 150 for compressing or restoring the image data with an image quality that is determined by the resolution and image quality determining unit 130. The scaler 140 includes a plurality of scalers, here, first and second scalers 141 and 142 for resizing image data with various sizes. Also, the compression/restoring unit 150 includes a plurality of compression units, here, first and second compression units 151 and 152 for compressing image data with different compression rates.

Figure 3:
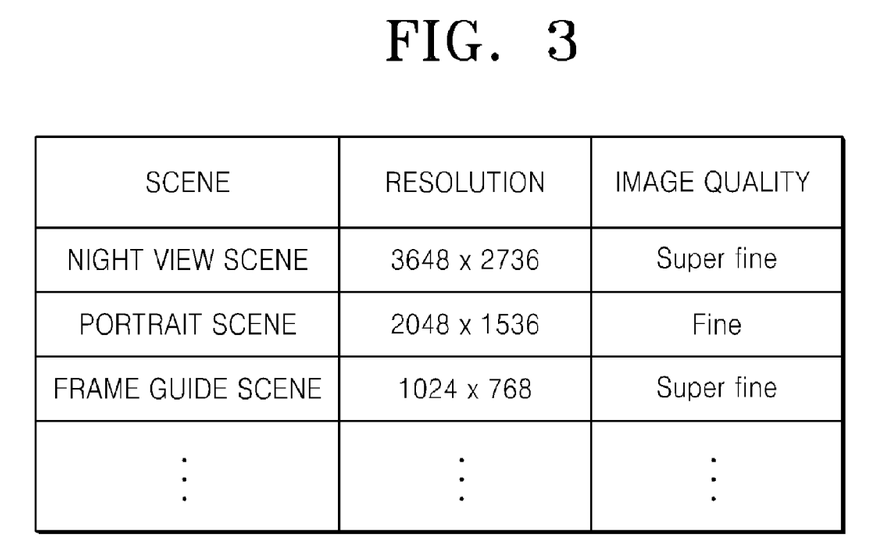
FIG. 3 is a table showing an example of a database of the digital signal processor illustrated in FIG. 2.

FIG. 3 is a table showing an example of the database 120 of the DSP 101 illustrated in FIG. 2. For example, if an input image is recognized as a night view scene, a resolution of the input image may be 3648×2736, and an image quality thereof may be Super fine. If the input image is recognized as a portrait scene, the resolution of the input image may be 2048×1536, and an image quality thereof may be Fine. If the input image is a frame guide scene, the resolution of the input image may be 1024×768, and an image quality thereof may be Super fine. The database 120 may be established by the user or the designer, or based on prior photographing data. For example, when photographing a night view scene, data regarding resolutions and image qualities selected by the user is accumulated according to prior photographing operations, and the accumulated data may constitute a database based on frequencies of the resolutions and the image qualities. The database 120 as shown in FIG. 3 may have a high resolution since a broad scene needs to be photographed when photographing a night view scene, compared to when photographing a portrait scene, and also, an image quality of the night view scene needs to be the same as or higher than when photographing a portrait scene. Thus, the image quality is set as Super fine. On the other hand, when photographing a portrait scene, a subject is smaller than when photographing a night view scene, and thus a resolution thereof may also be set smaller than that of the night view scene. In addition, the image quality may be set according to scenes based on the intention of the user or prior photographing data of the user.

The scaler 140 resizes an image according to resolutions included in the database 120. For example, the first scaler 141 resizes an image to have a resolution of 3648×2736, and the second scaler 142 may resize an image to have a resolution of 2048×1536. Also, the compression/restoring unit 150 may compress an image with a compression rate included in the database 120 according to image qualities. For example, the first compression unit 151 compresses an image with a compression rate having an image quality of Super fine, and the second compression unit 152 compresses an image with a compression rate having an image quality of Fine.

Figure 4:
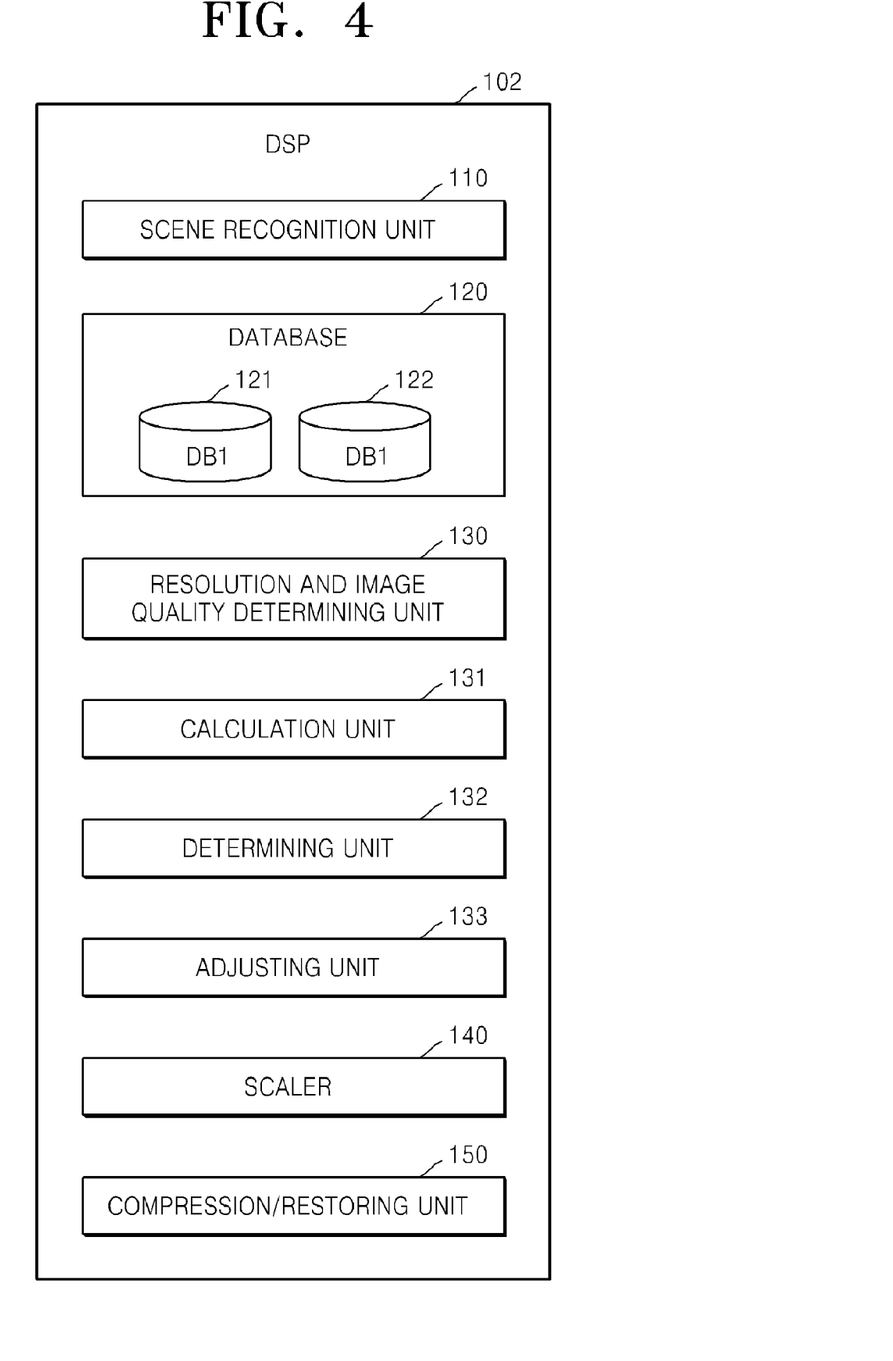
FIG. 4 is a block diagram illustrating a DSP of the digital image signal processing apparatus of FIG. 1, according to another embodiment of the present invention.

FIG. 4 is a block diagram illustrating a DSP 102 of the digital image signal processing apparatus of FIG. 1, according to another embodiment of the present invention.

Referring to FIG. 4, the DSP 102 includes the scene recognition unit 110 for recognizing a scene with respect to an input image, the database 120 in which resolutions and image qualities according to scenes of the input image are stored, the resolution and image quality determining unit 130 for determining a resolution and an image quality corresponding to a recognized scene, the scaler 140 for resizing the scene with a determined resolution, and the compression/restoring unit 150 for compressing or restoring the image with a determined image quality. Also, the DSP 102 includes a calculation unit 131 for calculating a number of images, that is, how many images of the determined resolutions and image qualities may be stored in the storage area of the memory 50, a determining unit 132 for checking the number of images to determine whether to store the input image with the determined resolution and image quality, and an adjusting unit 133 for adjusting the image such that, if it is determined to store the image, the image is resized and compressed with the resolution and image quality determined by the scaler 140 and the compression/restoring unit 150, and if it is determined not to store the image, the resolution and image quality of the image are adjusted.

In detail, a first database 121 including priorities of resolutions and priorities of image qualities according to scenes, and a second database 122 including resolutions corresponding to the priorities of resolutions and image qualities corresponding to the priorities of image qualities are stored in the database 120.

Figure 5:
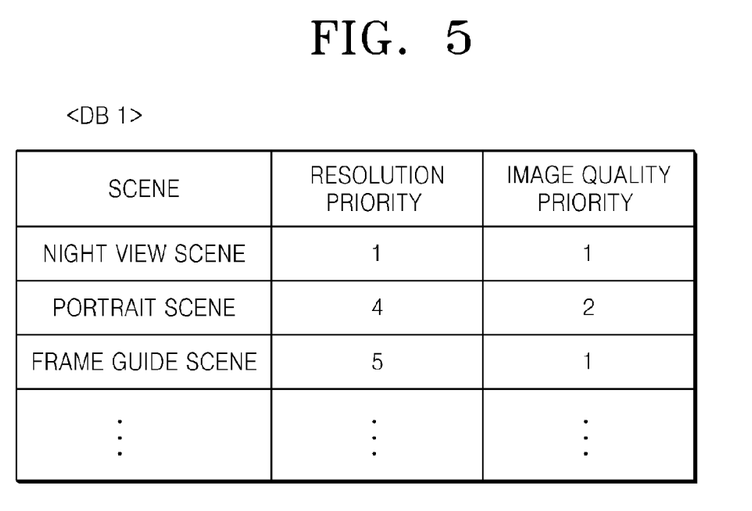
FIG. 5 is a table showing an example of a first database of the DSP of FIG. 4.

FIG. 5 is a table showing an example of the first database 121 of the DSP 102 of FIG. 4. In the first database 121, the priorities of resolutions and the priorities of image qualities according to scenes are stored. For example, when photographing a night view scene, a priority of a resolution is stored as 1, and a priority of an image quality is stored as 1, and when photographing a portrait scene, a priority of a resolution is stored as 4, and a priority of an image quality is stored as 2. Also, when photographing a frame guide scene, a priority of a resolution is stored as 5, and a priority of an image quality is stored as 1.

Figure 6:
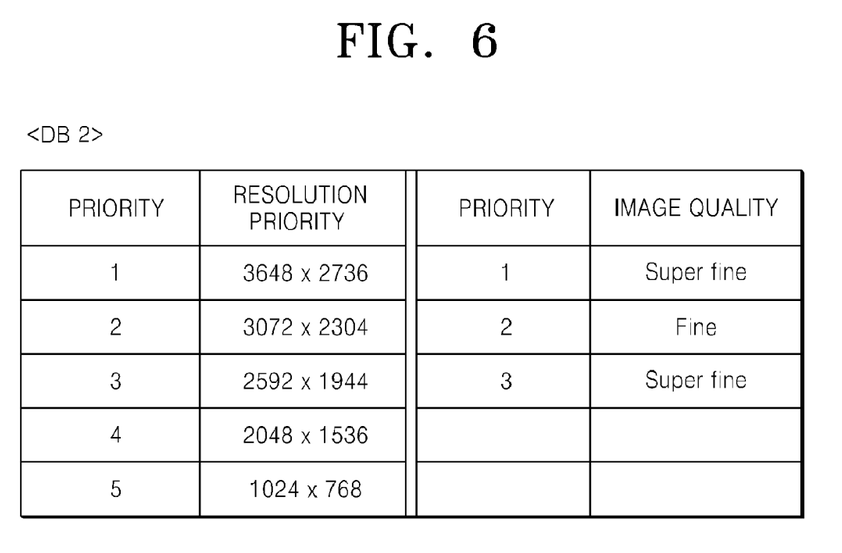
FIG. 6 is a table showing an example of a second database of the DSP of FIG. 4.

FIG. 6 is a table showing an example of the second database 122 of the DSP 102 of FIG. 4.

Referring to FIG. 6, resolutions and image qualities corresponding to priorities are stored in the second database 122. A resolution of Priority 1 is 3648×2736, and a resolution of Priority 2 is 3072×2304, a resolution of Priority 3 is 2592×1944, a resolution of Priority 4 is 2048×1536, and a resolution of Priority 5 is 1024×768. Resolutions corresponding to priorities may be modified according to the setup of the user. Also, an image quality of Priority 1 is Super fine, that of Priority 2 is Fine, and that of Priority 3 is Normal, and the image qualities are stored in the second database 122.

Referring to FIG. 4 again, scene recognition is performed on an image input to the scene recognition unit 110, and a priority of resolutions and a priority of image qualities corresponding to the recognized scene are deduced from the first data base 121. Then, a resolution corresponding to the priority of the resolutions and an image quality corresponding to the priority of image qualities are deduced from the second database 122.

When resizing and compressing the image with the resolution and the image quality deduced from the second database 122, the calculation unit 131 calculates how many images may be stored in the storage area of the memory 50 of FIG. 1. A calculation result of the calculation unit 131 may be displayed on the display unit 60. The user checks a calculation result displayed on the display unit 60 to determine whether to apply the resolution and the image quality deduced from the second database 122. The determining unit 132 may determine whether to apply the resolution and the image quality that are deduced according to the determination result of the user. Also, the determining unit 132 may determine whether to apply the deduced resolution and the deduced image quality by using an automatic control system. If the determination result of the determining unit 132 does not satisfy the calculation result, that is, if the resolution and the image quality are not to be applied, the adjusting unit 133 may adjust the priority of at least one of the group consisting of the resolution and the image quality to a next priority. For example, when applying the resolution and the image quality resulting from the calculation, and five images may be stored in the remaining storage area of the memory 50, the user may store more images. Here, the priority of the resolution may be adjusted to a next priority, or the priority of the image quality may be adjusted to a next priority by using the adjusting unit 133. The resolution and image quality determining unit 130 determines a resolution and an image quality corresponding to the priority of the resolution and the priority of the image quality adjusted by the adjusting unit 133, and whether to apply the resolution and the image quality may be determined based on the resolution and the image quality by using the calculation unit 131 and the determining unit 132. When applying the resolution and the image quality, the image may be resized with the resolution which is applied by the scaler 140 and compressed with the image quality which is applied by the compressing/restoring unit 150.

A digital image signal processing method according to an embodiment of the present invention is described in detail below.

Figure 7:
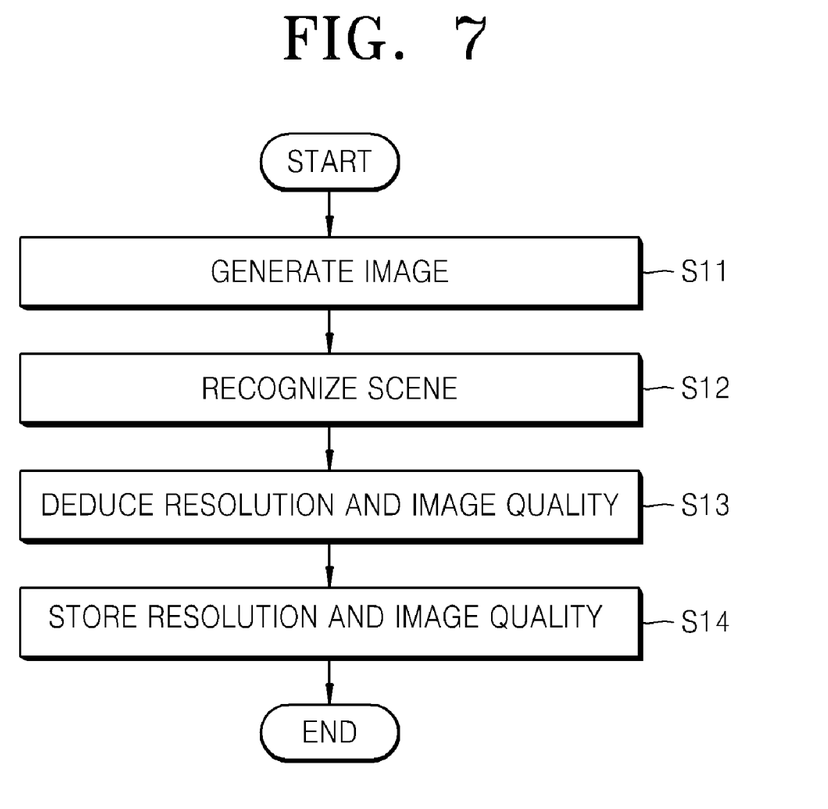
FIG. 7 is a flowchart illustrating a digital image signal processing method according to an embodiment of the present invention.

FIG. 7 is a flowchart illustrating a digital image signal processing method according to an embodiment of the present invention.

Referring to FIG. 7, in operation S11, an image is generated, and in operation S12, a scene is recognized from the image. The image may be generated as an image of one frame input from an imaging device, or may be an image obtained by restoring an image file recorded to a memory. Color components, brightness information, etc., according to scenes may be compared with the scene of the image to thus recognize the scene.

In operation S13, a resolution and an image quality corresponding to the recognized scene are deduced. Resolutions and image qualities according to scenes are stored in a database in advance, and the resolution and the image quality corresponding to the recognized scene may be deduced from the database.

In operation S14, the image is resized with the deduced resolution and compressed with the deduced image quality and stored.

Figure 8:
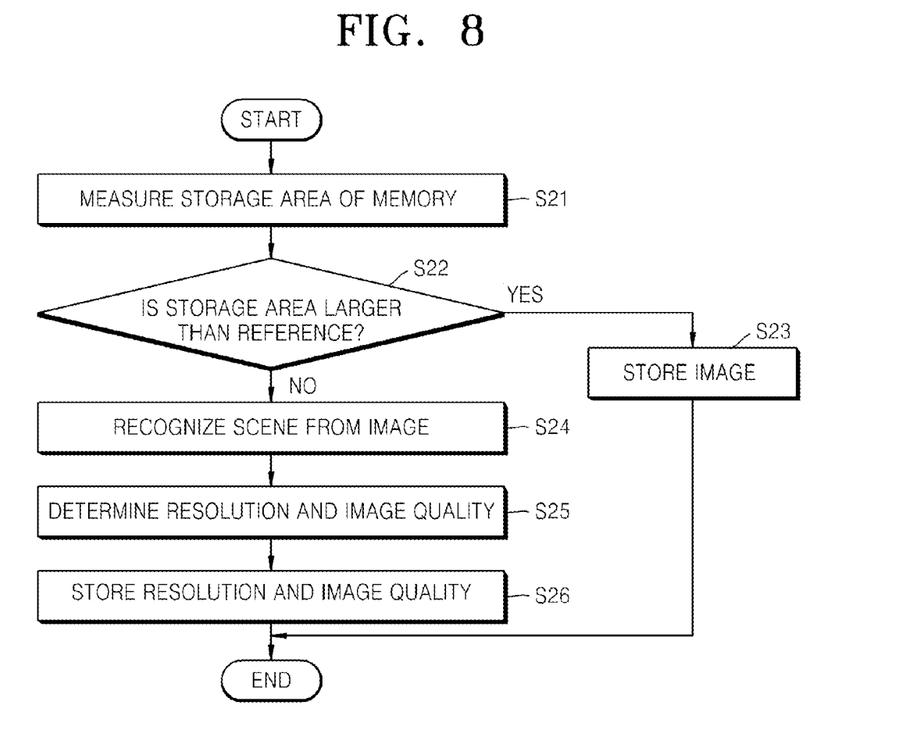
FIG. 8 is a flowchart illustrating a digital image signal processing method according to another embodiment of the present invention.

FIG. 8 is a flowchart illustrating a digital image signal processing method according to another embodiment of the present invention. Referring to FIG. 8, an available storage area of the memory is measured by an input of a user or automatically, in operation S21.

In operation S21, whether the measured storage area is smaller than a predetermined reference is determined.

If the measured storage area is larger than the reference, in operation S22, an input image is compressed and stored in operation S23. According to the current embodiment, the storage area of the memory is determined in comparison to the predetermined reference, but the present invention is not limited thereto. The measured storage area of the memory is informed to the user by, for example, displaying a graph corresponding to a size of the measured storage area of the memory on a display, and a resolution or an image quality according to the recognized scene of an image according to a manipulation signal of a user may be applied to the image or a predetermined resolution and a predetermined image quality may be applied to the image.

Otherwise, if the measured storage area is smaller than the reference, in operation S21, a scene of the input image is recognized in operation S24. In operation S25, a resolution and an image quality corresponding to the recognized scene are deduced. A resolution and an image quality corresponding to the recognized scene of the image may be deduced from the database including resolutions and image qualities according to scenes, as described above with reference to FIG. 7.

In operation S26, the image is resized with the deduced resolution and compressed with the deduced image quality and stored.

According to the current embodiment of the present invention, the storage area of the memory is measured, and if the storage area is insufficient, a resolution and an image quality that are appropriate for the scene of the image are applied to the image, thereby efficiently using the remaining storage area of the memory. That is, the user can obtain images having desired resolution and image quality according to the scene and store as many images as possible.

Figure 9:
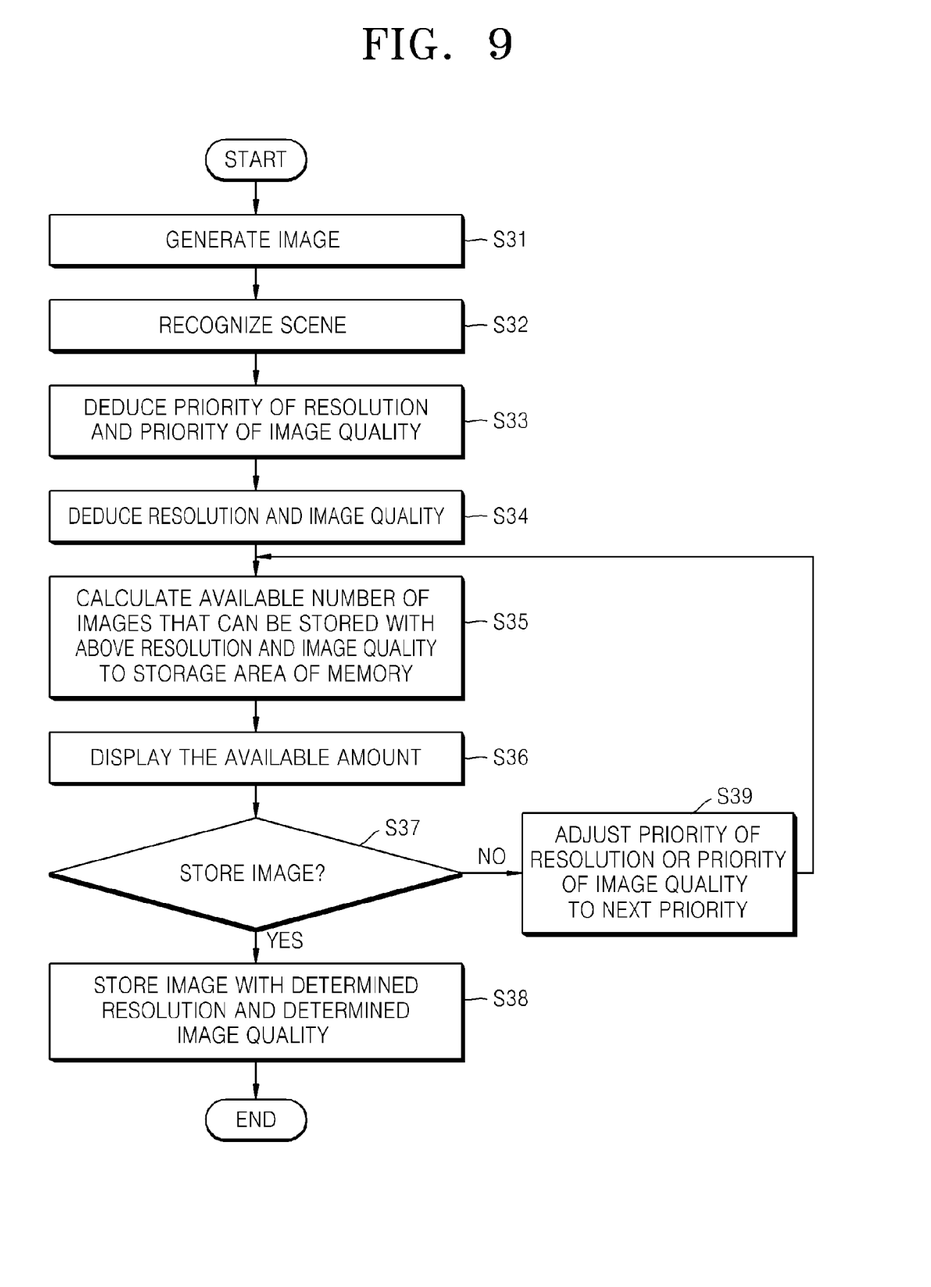
FIG. 9 is a flowchart illustrating a digital image signal processing method according to another embodiment of the present invention.

FIG. 9 is a flowchart illustrating a digital image signal processing method according to another embodiment of the present invention.

Referring to FIG. 9, in operation S31, an image is generated. In operation S32, scene recognition is performed on the image.

In operation S33, a priority of a resolution and a priority of an image quality corresponding to the recognized scene are deduced. In operation S34, a resolution corresponding to the priority of the resolution and an image quality corresponding to the priority of the image quality are deduced.

Next, in operation S35, it is calculated how many images can be stored in a storage area of the memory if the image is resized with the resolution and compressed with the image quality. That is, an available number of images that can be stored in the storage area of the memory is calculated.

In operation S36, the number of images is displayed.

Figure 10:
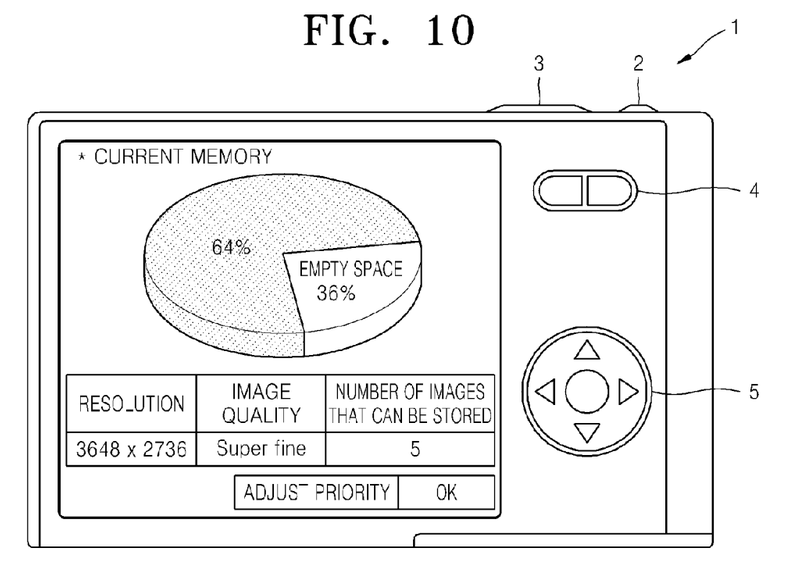
FIG. 10 is a pictorial schematic view of an example of displaying an available number of images that can be stored in a storage area of a memory of the digital image signal processing method of FIG. 9.

FIG. 10 is a schematic view of an example of displaying a storage capacity (number) of a memory of the digital image signal processing method of FIG. 9. For example, as illustrated in FIG. 10, the available number of images that can be stored in the storage area of the memory may be displayed on a rear LCD of a digital camera 1 under the title "current memory". Here, it is displayed on the rear LCD that an empty space in the total memory is 36% and that fives images with a resolution of 3648×2736 and an image quality Super fine may be stored. Also, a priority adjustment icon and an OK icon are displayed at a lower part of the rear LCD.

In addition, a shutter release button 2 for inputting a photographing signal and a power button 3 for turning on/off the digital camera 1 are included on an upper surface of the digital camera 1. Also, an optical or digital zoom button 4 and functional buttons 5 for performing mode conversion, menu manipulation, selection manipulation, or the like are included on a rear surface of the digital camera 1.

Referring to FIG. 9 again, in operation S37, whether the image is to be stored is determined, and in operation S38, if it is determined in operation S37 that the image is to be stored according to a manipulation signal of a user, the image is resized with a determined resolution and compressed with a determined image quality to be stored. For example, when the user checks the display screen and determines to store the image, the OK icon of FIG. 10 may be activated. Accordingly, the image may be stored with the determined resolution and the determined image quality.

Alternatively, when more than five images are to be captured, at least one of the group consisting of the priority of the determined resolution and the priority of the determined image quality is adjusted in operation S39. In operation S34, a resolution and an image quality corresponding to the adjusted priority are deduced, and in operation S35, an available number of images to be stored in the storage area of a memory according to the adjusted resolution and the image quality is calculated. Next, in operation S36, the amount is displayed.

Figure 11:
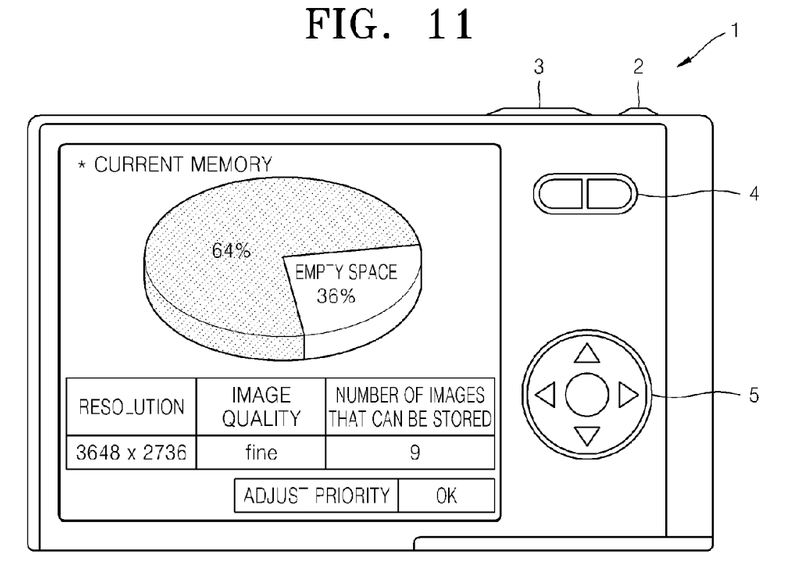
FIG. 11 is a pictorial schematic view of another example of displaying a storage capacity (number of images) in a storage area of a memory of the digital image signal processing method of FIG. 9.

FIG. 11 is a schematic view of another example of displaying a storage capacity (number) of a memory of the digital image signal processing method of FIG. 9. For example, referring to FIG. 11, a number of images that can be stored according to a priority of image quality, which is a next priority of image quality, is calculated and a result of the calculation may be displayed. If the resolution is the same, an image of an image quality Super fine is 3.88 MB, an image of an image quality Fine is 2.15 MB, and an image of an image quality Normal quality is 1.57 MB. Based on these amounts, when the image quality is adjusted from Super fine to Fine, the number of images that can be additionally stored increases to 9.

In operation S35, the user checks the calculation result, and determines whether to store the image by applying a resolution and an image quality that are determined by the adjustment, and if the user determines that the image is to be stored in operation S37, the image is resized and compressed with the determined resolution and image quality, respectively, in operation S38. Otherwise, if the user determines that the image is not to be stored in operation S37, the priority of the resolution or the priority of the image quality is adjusted again in operation S39.

According to the current embodiment of the present invention, images with appropriate resolutions and image qualities according to scenes can be obtained and a space of a memory can be efficiently used, and the user may capture as many images as wanted.

The invention can also be embodied as computer readable code on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, etc. Also, the computer readable recording medium can also be distributed over network coupled computer systems so that the computer readable code is stored and executed in a distributed fashion. Also, functional programs, code, and code segments for accomplishing the present invention can be easily construed by programmers of ordinary skill in the art to which the present invention pertains.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A digital image signal processing method comprising:
   recognizing, with a processor, a scene of an image;
   determining, with the processor, a resolution and an image quality corresponding to the recognized scene; and
   resizing and compressing the image with the determined resolution and the determined image quality;
   wherein the determining a resolution and an image quality corresponding to the recognized scene comprises:
   deducing a priority of the resolution and a priority of the image quality corresponding to the recognized scene; and
   determining a resolution and an image quality corresponding to the deduced priority of the resolution and the deduced priority of the image quality.

2. The method of claim 1, further comprising:
   measuring a storage area of a memory; and
   comparing the storage area of the memory with a reference,
   wherein, if the storage area of the memory is smaller than the reference, a resolution and an image quality corresponding to the recognized scene are determined.

3. The method of claim 1, further comprising generating a database including resolutions and image qualities according to scenes.

4. The method of claim 3, wherein the database is generated according to an input of a user.

5. The method of claim 1, further comprising, if compressing the image with the determined resolution and the determined image quality:
   calculating an available number of images that can be stored in the storage area of the memory; and
   displaying the available number of images.

6. The method of claim 1, further comprising, if compressing the image with the determined resolution and the determined image quality:
   calculating an available number of images that can be stored in the storage area of the memory in which the images can be stored;
   displaying the available number of images;
   determining whether to compress the image;
   if the image is not to be compressed, adjusting at least one of the group consisting of the priority of the resolution and the priority of the image quality to a next priority; and deducing a resolution and an image quality corresponding to the adjusted priority of the resolution or the image quality.

7. The method of claim 1, wherein the scene is one selected from the group consisting of a frame guide scene, a night view scene, a portrait scene, a landscape scene, a macro scene, and a white scene.

8. The method of claim 7, wherein a resolution of the landscape scene is greater than a resolution of the portrait scene.

9. A non-transitory computer readable recording medium having embodied thereon a program for executing, with a processor, a method comprising:
   recognizing, with a processor, a scene of an image;
   determining, with the processor, a resolution and an image quality corresponding to the recognized scene; and
   resizing and compressing the image with the determined resolution and the determined image quality;
   wherein the determining a resolution and an image quality corresponding to the recognized scene comprises:
   deducing a priority of the resolution and a priority of the image quality corresponding to the recognized scene; and determining a resolution and an image quality corresponding to the deduced priority of the resolution and the deduced priority of the image quality.

10. A digital image signal processing apparatus comprising:
a scene recognition unit that recognizes a scene of an image;
a database that includes resolutions and image qualities according to scenes;
a resolution and image quality determining unit that determines a resolution and an image quality corresponding to the recognized scene by deduction from the database;
a scaler that resizes the image to have the determined resolution; and
a compression unit that compresses the image to have the determined image quality.

11. The digital image signal processing apparatus of claim 10, wherein
the scaler comprises a plurality of scalers for resizing the image with different sizes, and
the compressing unit comprises a plurality of compression units that apply different compression rates to the image so as to have different image qualities.

12. The digital image signal processing apparatus of claim 10, further comprising:
a memory that stores an image file including the image;
a measuring unit that measures a storage area of the memory;
a comparing unit that compares the storage area of the memory with a reference; and
a control unit that controls such that if the storage area of the memory is smaller than the reference, the resolution and image quality determining unit determines a resolution and an image quality of the image.

13. The digital image signal processing apparatus of claim 10, further comprising:
a memory that stores an image file including the image; and
a restoring unit that restores the image file to deduce the image.

14. The digital image signal processing apparatus of claim 10, further comprising an imaging device for inputting the image.

15. The digital image signal processing apparatus of claim 10, wherein:
the database comprises:
a first database including priorities of resolutions and image qualities according to scenes; and
a second database including resolutions corresponding to the priorities of the resolutions and image qualities corresponding to priorities of the image qualities;
and wherein:
the resolution and image quality determining unit deduces:
from the first database, the priorities of the resolutions and the priorities of the image qualities according to scenes; and
from the second database, the resolutions according to the priorities of the resolutions and the image qualities according to the priorities of the image qualities.

16. The digital image signal processing apparatus of claim 15, further comprising, when compressing the image with the determined resolution and the determined image quality:
a calculation unit that calculates an available number of images that can be stored in a remaining storage area of a memory;
a display unit that displays the available number of images;
a determining unit that determines whether to compress the image; and
an adjusting unit that adjusts at least one of the group consisting of the priority of the resolution and the priority of the image quality to a next background priority, if the image is not to be compressed,
wherein the resolution and image quality determining unit deduces a resolution and an image quality corresponding to the adjusted priority of the resolution or the image quality.

17. The digital image signal processing apparatus of claim 10, wherein the database comprises a resolution of a landscape scene that is greater than a resolution of a portrait scene.

18. The digital image signal processing apparatus of claim 10, wherein the scene is one selected from the group consisting of a frame guide scene, a night view scene, a portrait scene, a landscape scene, a macro scene, and a white scene.

19. The digital image signal processing apparatus of claim 10, wherein the database is generated based on user input.

* * * * *